United States Patent [19]

Nobusawa

[11] 4,060,325

[45] Nov. 29, 1977

[54] AUTOMATIC FOCUSING SYSTEM EMPLOYING TWO VARIABLE FREQUENCY OSCILLATORS

[75] Inventor: Tsukumo Nobusawa, Minami Oizumi, Japan

[73] Assignee: Asahi Kogaku Kogyo Kabushiki Kaisha, Tokyo, Japan

[21] Appl. No.: 687,040

[22] Filed: May 17, 1976

[30] Foreign Application Priority Data

May 20, 1975 Japan .................................. 50-60006

[51] Int. Cl.$^2$ .......................... G03B 7/08; G01C 3/08
[52] U.S. Cl. ...................................... 354/25; 250/204; 356/4
[58] Field of Search .......................... 354/25, 31, 195; 350/204; 352/140; 355/56; 250/201; 353/101; 356/4

[56] References Cited

U.S. PATENT DOCUMENTS

| 3,899,251 | 8/1975 | Frenk et al. .......................... 356/4 X |
| 3,988,747 | 10/1976 | Lermann et al. ...................... 354/25 |

*Primary Examiner*—L. T. Hix
*Assistant Examiner*—M. L. Gellner
*Attorney, Agent, or Firm*—Christie, Parker & Hale

[57] ABSTRACT

In an automatic focusing system having an objective spaced an adjustable distance from an image plane, two variable frequency oscillators, each controlled by a separate photoconductor element, produce two variable-frequency signals that have substantially the same frequency when light passing through the objective is brought into focus at the image plane. The two variable-frequency signals are compared, and, upon detecting a difference in frequency between them, the spacing between the objective and the image plane is adjusted to a relative position at which the frequencies thereof are substantially the same.

5 Claims, 10 Drawing Figures

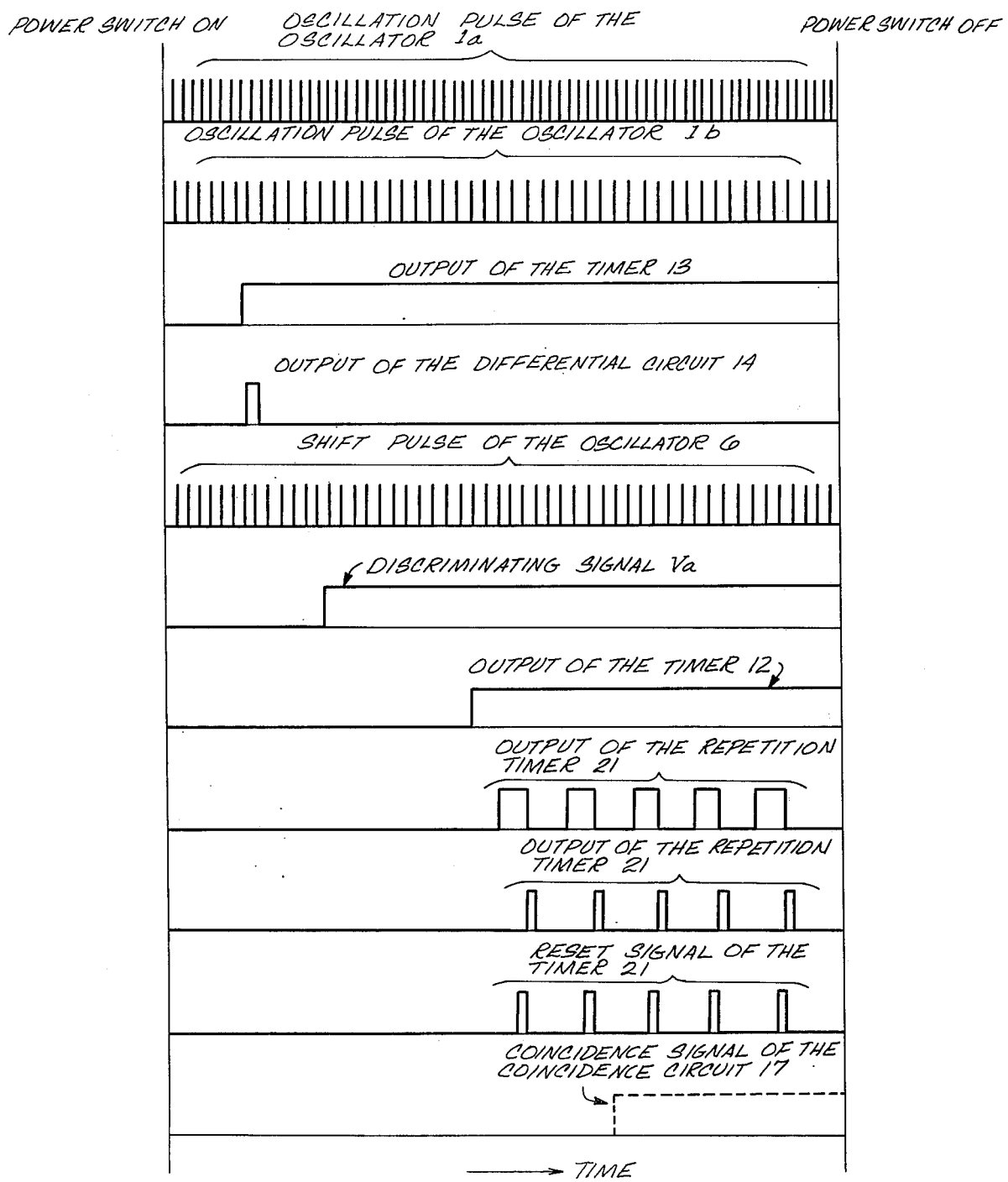

AUTOMATIC FOCUSING SYSTEM EMPLOYING TWO VARIABLE FREQUENCY OSCILLATORS

BACKGROUND OF THE INVENTION

In general, this invention relates to an automatic focusing system having an objective spaced an adjustable distance from an image plane. More particularly, it relates to such a system which employs a pair of variable frequency oscillators.

Focusing of an optical system involves adjusting the spacing between an objective and an image plane to a relative position where maximum sharpness of the image is achieved. Various types of manual focusing systems are known. With the type of manual system typically used in a single lens reflex camera, a viewfinder enables viewing of the image formed on a focusing screen by mirror-reflected light that traverses the same distance from objective to focusing screen as the distance from objective to film plane. By manually rotating a focusing ring, the objective is moved to a point where the image is sharpest.

In recent years, there has been considerable activity directed to developing automatic focusing systems. It is now well known to employ servomechanism techniques for automatic focusing wherein an electric signal is produced and provided to a motor for moving the objective relative to the image plane. Various methods have been proposed as to how such an electrical signal can be produced for appropriately controlling the motor to move the objective in the proper direction and by the proper amount.

Photoconductor elements such as cadmium sulfide (CdS) cells have been employed in these methods. A CdS cell is characterized by the following phenomenon. It functions as a variable resistor having a peak resistance value when light which impinges on it is in sharp focus.

With this phenomenon in mind, consider the effect of positioning a CdS cell at an image plane spaced an adjustable distance from an objective. When the spacing between objective and image plane is such that the image formed at the image plane is in focus, the internal resistance of the CdS cell is at a maximum. If the spacing is changed in either direction, the internal resistance decreases. The functional relationship between the internal resistance and this spacing thus has a positive slope on one side of the maximum, zero slope at the maximum, and a negative slope on the opposite side of the maximum.

Significant problems have been encountered in efforts to use a CdS cell in an automatic focusing system. A principal factor underlying these problems is that this change in slope is very gradual. In other words, there is only a small rate of change of internal resistance with respect to change of spacing in the vicinity of an in-focus position under the circumstance that the CdS cell is positioned at the image plane. This factor makes it difficult to employ the CdS cell as a transducer in a conventional analog circuit arrangement for producing a control signal for the motor of the automatic focusing system.

SUMMARY OF THE INVENTION

This invention overcomes the problems involved in an automatic focusing system as to the use of a photoconductor element such as a CdS cell.

The invention is embodied in an automatic focusing system in which, as is conventional, an objective is spaced an adjustable distance from an image plane. The improvement provided by this invention comprises, briefly nd generally, first means for providing first and second variable-frequency signals that have substantially the same frequency when light passing through the objective is brought into focus at the image plane; and second means responsive to a difference in frequency between the first and second variable-frequency signals for adjusting the spacing between the objective and the image plane to a relative position at which the frequencies thereof are substantially the same.

The first means includes the first and second photoconductor elements. The concepts underlying the employment of these photoconductor elements departs from the prior art approaches wherein the photoconductor element is disposed ay the image plane. In particular, the first photodconductor element has impinging on it light which has traversed a first distance from the objective to reach it, this first distance being less than the adjustable distance. On the other hand, the second photoconductor element has impinging on it light which has traversed a second distance from the objective to reach it, this second distance being greater than the adjustable distance. A further distinguishing feature resides in the use of each of these photoconductor elements as a variable resistor in a variable frequency oscillator. In particular, a first variable frequency oscillator, which produces the first variable-frequency signal, is controlled by the resistance value of the first photoconductor element; and, a second variable frequency oscillator, which produces the second variable frequency signal, is controlled by the resistance value of the second photoconductor element.

In various alternative embodiments disclosed herein, different arrangements are employed for producing a drive-direction control signal used to control the direction in which an electromechanical drive section moves the objective to bring the image into focus. In a first embodiment, first and second counters respectively respond to the first and second variable-frequency signals to accumulate first and second multi-bit counted values. These two counted values are transferred to two parallel-input shift registers which respond during a readout type operation to shift pulses to shift out the counted values on a bit at a time basis to a logic circuit arrangement. The drive-section control signal is provided by this logic circuit arrangement in the from of two parallel bits. When the frequency of the first variable frequency oscillator is greater than the frequency of the second variable frequency oscillator, the above-described elements of the first embodiment cooperate to cause a first one of the parallel bits to equal logic level "1". On the other hand, when the frequency of the first variable frequency oscillator is less than or equal to the frequency of the second variable oscillator, the second one of the parallel bits equals logic level "1".

In a second embodiment, first and second frequency divider circuits respectively respond to the first and second variable frequency signals and supply shift pulses to first and second serial-input shift registers. A separate source of shift pulses (these latter shift pulses having a constant PRF) is connected to these serial-input shift registers to cause the same type of readout operation as in the first embodiment. Similarly, the second embodiment includes the same logic circuit arrangement for producing the drive-direction control signal in the form of two parallel bits.

Other significant features, including features of an arrangement for repetitiously comparing the frequencies of the two variable-frequency signals, are described in more detail below and brought out in the appending claims.

BRIEF DESCRIPTION OF THE DRAWINGS

FIG. 10 is a timing diagram of the embodiment shown in FIG. 1.

DETAILED DESCRIPTION

Figure 1:
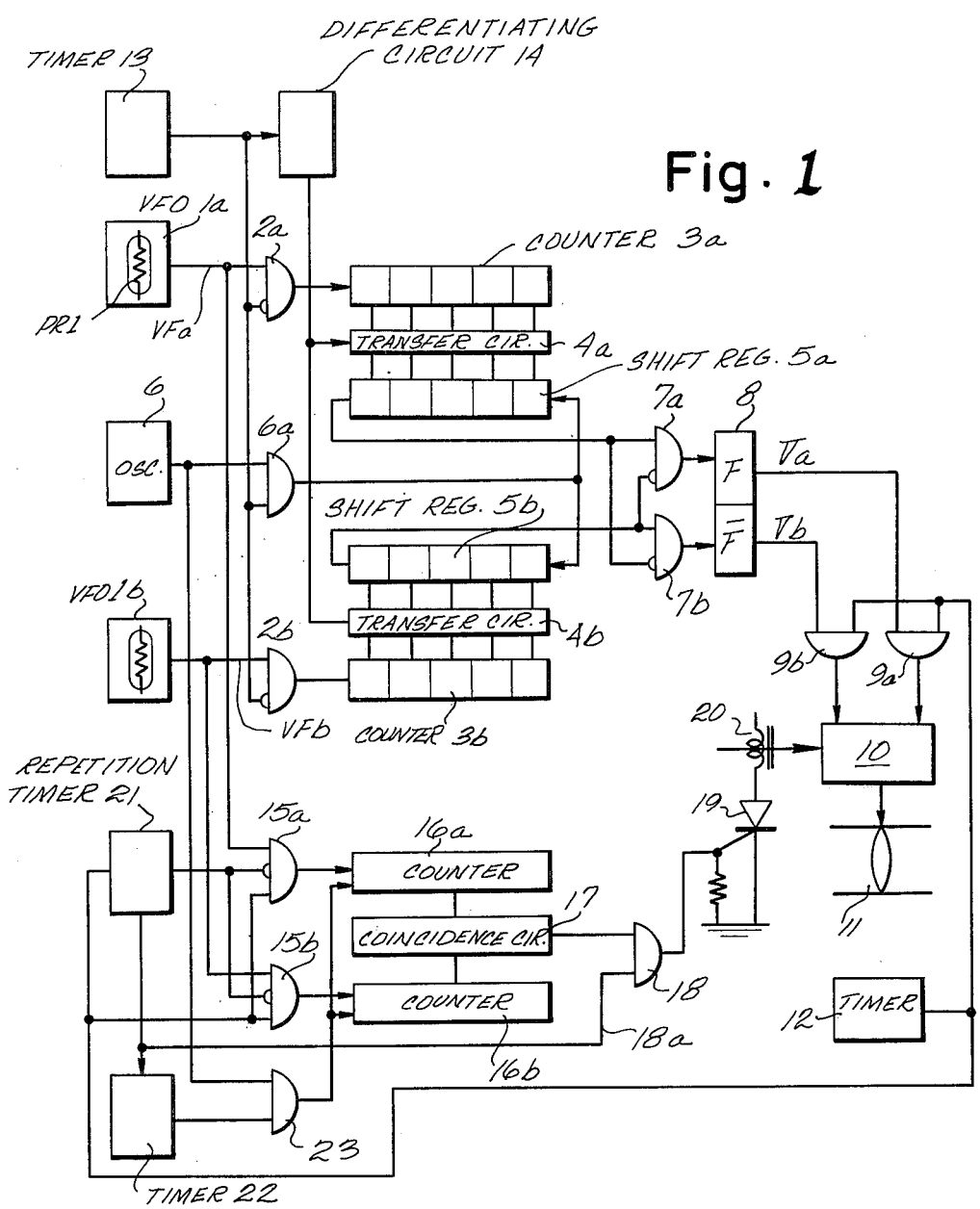
FIG. 1 is a block diagram showing an automatic focusing system according to this invention wherein a portion thereof producing a drive-direction control signal is arranged in accordance with a first embodiment.
Figure 5:
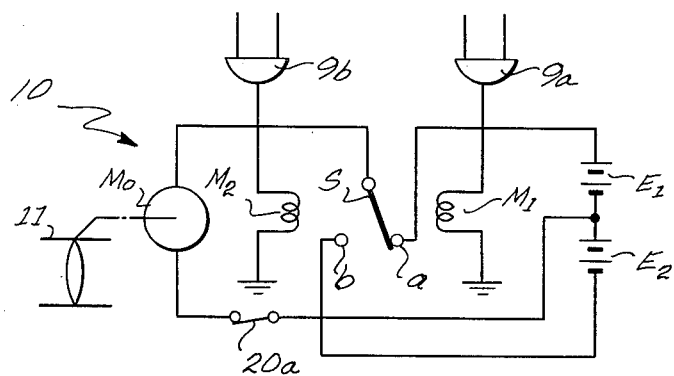
FIG. 5 is a schematic and logic block diagram showing a suitable arrangement for the electromechanical drive section 10 of FIG. 1.

An embodiment of the invention is organized as shown in FIG. 1. An electromechanical drive section 10, the details of which are shown in FIG. 5, is electrically controlled to adjust the spacing between an objective 11 and an image plane wherein an image is formed by light which has traversed the adjustable distance from objective 11 to the image plane.

A photoconductor element PR1 has impinging on it light which has traversed a first distance from objective 10 to reach it. In accordance with an important concept underlying this invention, this first distance is always less than the adjustable distance between objective 10 and the image plane. Another photoconductor element PR2 has impinging on it light which has traversed a second distance from objective 10 to reach it. The second distance is always greater than the adjustable distance between objective 10 and the image plane.

Figure 2:
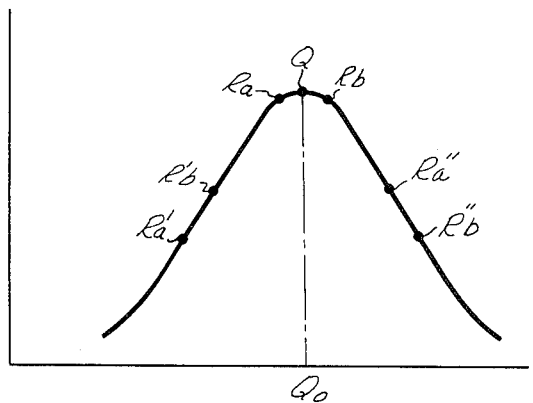
FIG. 2 is a graph which shows the variable-resistance characteristics of a photoconductor element, and which shows the various resistance values of the two spaced-apart elements PR1 and PR2 under three different operating conditions.

Each of the photoconductor elements serves as a variable resistor having a peak resistance value when the light impinging on it is in focus. In this connection, reference is made to FIG. 2. Briefly, FIG. 2 shows the bell-shaped characteristic curve defined by plotting, as the dependent variable, photoconductor element internal resistance, and, as the independent variable, the distance traversed by light from the objective to the photoconductor element. In this graph, the distance along the abscissa between the origin and the point $Q_o$ corresponds to the particular distance from objective to a plane where the image is in sharpest focus. Under the condition that one of the photoconductor elements is spaced from the objective by this particular distance, the internal resistance thereof is maximum. If the spacing is changed in either direction, the internal resistance decreases. The functional relationship between the internal resistance and this spacing thus has a positive slope on one side of the maximum, zero slope at the maximum, and a negative slope on the opposite side of the maximum.

Consider now the points on the curve which are labelled $R_a$ and $R_b$. These points relate to an in-focus condition of operation. That is, the adjustable distance from objective to image plane has an in-focus value such that the image at the image plane is in focus. In this in-focus condition, photoconductor element PR1 has a resistance value of $R_a$ and photoconductor element PR2 has resistance value of $R_b$, with $R_a$ equalling $R_b$. It will be noted that the image plane position corresponds to the midpoint between the positions of PR1 and PR2.

Consider now the points on the curve which are labelled $R_a'$ and $R_b'$. These points relate to an out-of-focus stage of operation in which the adjustable distance from objective to image plane has a value less than the in-focus value. At this stage, photoconductor element PR1 has a resistance value $R_a'$, and photoconductor element PR2 has a resistance value $R_b'$. $R_b'$ is greater than $R_a'$. It will be understood that the image plane position corresponds to the midpoint between these two points here as well.

Consider now the points on the curve which are labeled $R_1''$ and $R_b''$. These points relate to an out-of-focus stage of operation in which the adjustable distance from objective to image plane has a value greater than the in-focus value. At this stage, photoconductor element PR1 has a resistance value $R_a''$, and photoconductor element PR2 has a resistance value, $R_a''$. $R_a''$ is greater than $R_b''$. It will be understood at the image plane position corresponds to the midpoint between these two points here as well.

Figure 3:
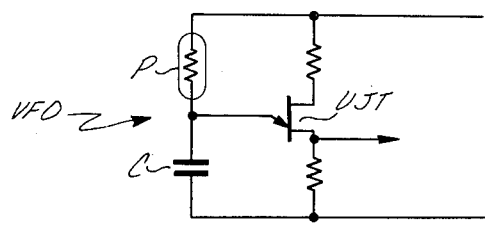
FIG. 3 is a schematic showing a suitable circuit arrangement for the type of variable frequency oscillator employed in the system of FIG. 1.

With reference again to FIG. 1, a variable frequency oscillator (VFO) 1a is controlled by the photoconductor element PR1 to produce a variable-frequency signal VFa. A variable-frequency oscillator (VFO) 1b is controlled by the photoconductor element PR2 to produce a variable-frequency VFb. A suitable circuit arrangement for the type of VFO employed in this invention will be described hereinafter with reference to FIG. 3. Although the invention is not limited thereto, each VFO is preferably of the pulse output type rather than one which produces a sinusoidal output.

The PRF or frequency of each VFO is reciprocally related to the resistance value of the photoconductor element which controls it. That is, when the resistance value is maximum (see point Q in FIG. 2), the VFO's frequency is minimum. Consider now the frequencies involved under the various conditions of operation. When the image plane is not sufficiently spaced away from the objective, the frequency of VFO 1a is greater than the frequency of VFO 1b. The reason for this will be appreciated by considering the points $R_a'$ and $R_b'$ on the curve of FIG. 2. In particular, the spacing of photoconductor elements PR1 and PR2 relative to the objective in this situation is such that the resistance value of photoconductor element PR2 is greater than the resistance value of photoconductor PR1. On the other hand, when the image is excessively away from the objective, the frequency of VFO 1a is less than the frequency of the VFO 1b. Again the reason for this will be appreciated in considering the curve of FIG. 2, particularly points $R_a''$ and $R_b''$ thereon. In particular, the spacing of photoconductor elements PR1 and PR2 relative to the objective in this situation is such that the resistance value of photoconductor PR2 is less than the resistance value of photoconductor PR1. As to the in-focus condition, the two frequencies are equal or substantially so. In this condition, the photoconductor elements PR1 and PR2 have the same resistance value.

Figure 4:
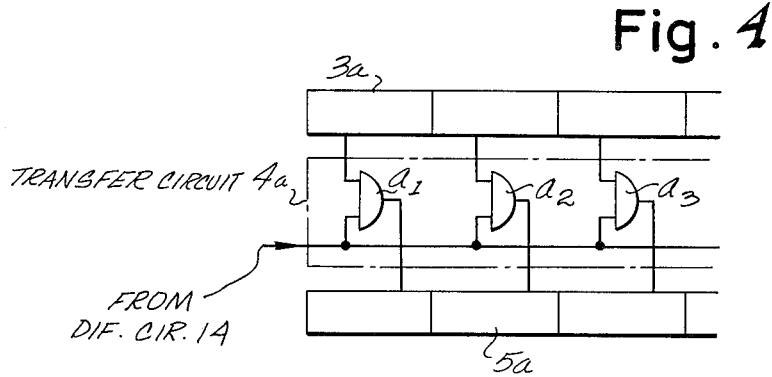
FIG. 4 is a logic block diagram showing a suitable arrangement for the transfer circuit 4a of FIG. 1.

The output pulses of VFO 1a and VFO 1b are supplied to multi-stage binary counters 3a and 3b through inhibit gate circuits 2a and 2b, respectively. The counters 3a and 3b count the pulses supplied to it during a predetermined timing interval referred to herein as the direction discrimination interval. The multi-bit counted values which are accordingly accumulated and memorized by counters 3a and 3b are transferred to parallel-input shift registers 5a and 5b through the action of transfer circuits 4a and 4b. Various structures of the transfer circuit 4a and 4b may be considered. A suitable type is shown in FIG. 4. As is clear from FIG. 4, by supplying driving pulse simultaneously to the one input terminals of AND circuits $a_1, a_2, a_3, \ldots$, the individual bits of the multi-bit counted values of the counter 3a (or 3b) can be transferred in parallel to shift register 5a (or 5b).

After the multi-bit counted values have been so transferred, shift pulses produced by an oscillator 6 are supplied to shift registers 5a and 5b through an AND circuit 6a, and, while this is being done, the memory contents of shift registers 5a and 5b are compared. Consider as an example that the contents of shift registers 5a and 5b are "01010" and "11100", respectively. With supply of shift pulses, first the outputs of shift registers 5a and 5b become "0" and "1", respectively, so that inhibit gate circuit 7a is closed (i.e., does not prodice a '1' output) whereas inhibit gate circuit 7b is opened (i.e., produces a '1' output). The output of inhibit gate circuit 7b is connected to the reset input F of a single-stage flip-flop 8. Initially, single-stage flip-flop 8 is in its reset state whereby its output, $V_b$ is "1". Thus, receiving the output of inhibit gate circuit 7b at this time does not change the output state of flip-flop 8.

The subsequent outputs of shift registers 5a and 5b are "1" and "1", and "0" and "1", respectively. It is readily understood that these outputs do not cause the output of flip-flop 8 to change. Then, shift registers 5a and 5b produce the outputs "1" and "0", respectively. At this point, inhibit gate circuit 7a opens for the first time, while inhibit gate circuit 7b is closed. This causes inversion of the output state of flip-flop 8 causing the output $V_a$ to become equal to "1". Thus, if the contents of shift register 5a is greater than the contents of the shift register 5b, the output $V_a$ of flip-flop 8 becomes finally "1"; whereas if the contents of shift register 5b is greater than the contents of shift register 5a, the output $V_b$ of the single-stage flip-flop 8 becomes finally "1". The drive direction control signal comprising bits $V_a$ and $V_b$ is supplied to electromechanicl drive section 10 via AND gates 9a and 9b. Depending upon whether $V_a$ or $V_b$ equals "1"; electromechanical drive 10 causes the objective 11 to be moved in one direction or the other towards the in-focus position. When bit $V_a$ equals "1", this causes the image forming position to be moved from the left-side out-of-focus range of FIG. 2 to the in-focus position $Q_o$. When bit $V_b$ equals "1", this causes the image forming position to be moved from the right-side out-of-focus range to the in-focus position $Q_o$. The time when either gate 9a opens or gate 9b opens for supplying either the bit $V_a$ or the bit $V_b$ to section 10 is determined by a timer 12.

Various structures may be used for electromechanical drive section 10. FIG. 5 shows a suitable structure. Supply of the bit $V_a$ excites a relay coil $M_1$ so that a responsive switch S is closed to the a-side. This causes a motor $M_0$ to be driven by a power source $E_1$ so as to move objective 11 in one direction. On the other hand, supply of bit $V_b$ excites a relay coil M so that the responsive switch S is closed to the b-side. This causes motor $M_0$ to be driven by a power source $E_2$ so that objective 11 is moved in the opposite direction.

The duration of the direction discrimination interval, during which pulses are supplied to counters 3a and 3b, is determined by a timer 13. While the output of timer 13 is 0, inhibit gate circuits 2a and 2b are open so that the pulses are supplied. When after a predetermined time timer 13 produces a "1" level output, inhibit gate circuits 2a and 2b are closed, thereby stopping the supply of pulses to counters 3a and 3b. The output of timer 13 is also supplied to transfer circuits 4a and 4b as the driving signals thereof through a differential circuit 14.

After actuation of a timer 12, the pulses of VFO 1a and VFO 1b are supplied to binary counters 16a and 16b through inhibit gate circuits 15a and 15b. The counted values of these counters are compared by a coincidence circuit 17. When the counted values of counters 16a and 16b are equal to each other, a coincidence signal is produced by an AND circuit 18. This coincidence signal is supplied to the gate of an SCR 19, so that, through conduction of this SCR 19, a relay coil 20 is excited. Thus, through the action of the responsive switch of the relay coil 20, the action of electromechanical drive section 10 is stopped. The SCR 19 and the relay coil 20 constitute a control circuit for stopping the action of drive section 10. This control circuit can be replaced by a well-known switching circuit.

Figure 6:
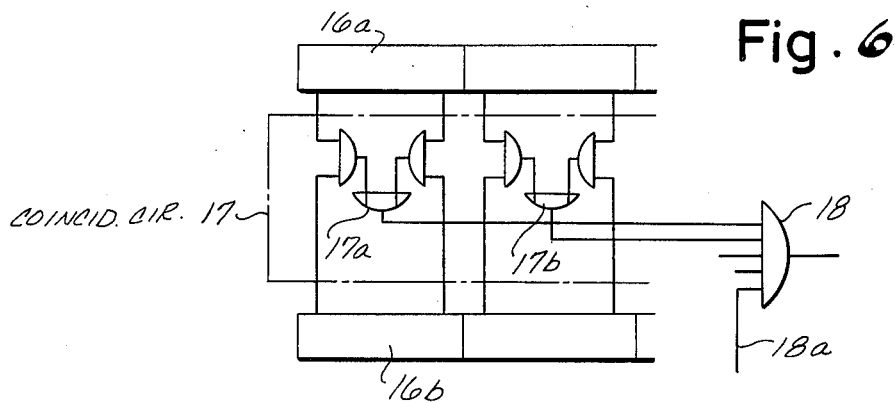
FIG. 6 is a logic block diagram of a suitable arrangement for the coincidence circuit 17 of FIG. 1.
Figure 7:
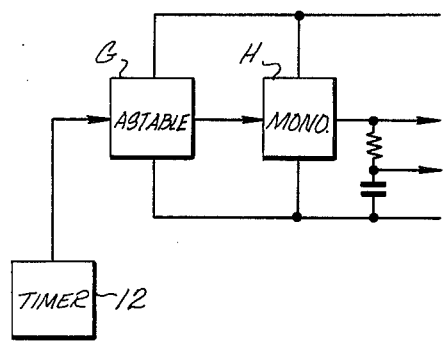
FIG. 7 is a block diagram of a suitable arrangment for the repetition time 21 of FIG. 1.

When the counted values of the counters 16a and 16b are not equal to each other, that is, when the objective is in out-of-focus state, coincidence circuit 17 does not produce the coincidence signal so that drive section 10 continues to move the objective. The coincidence circuit is a wellknown one, of which one example is shown in FIG. 6. OR circuits 17a, 17b, . . . have their outputs connected to respective ·inputs of AND circuit 18. When the corresponding counting elements of the counters 16a and 16b are in equal output states, all these outputs produce a "1" level. On the other hand, when the counted values of the counters 16a and 16b are different from each other, AND gate circuit 18 is not opened so that no coincidence signal is produced. Immediately after the counters 16a and 16b are reset, the output states of the corresponding counting elements are equal to each other, respectively. It is not desired to produce the coincidence signal in this state. For this reason, AND circuit 18 is provided with a trigger gate 18 which, as shown in FIG. 1, is connected to a repetition timer 21 so that AND gate circuit 18 is opened upon completion of the counting operation of the counters 16a and 16b. A trigger signal from timer 12 actuates repetition timer 21. Repetition timer 21 produces its output after a lapse of a predetermined time from the time it receives the trigger signal from timer 12. The output of repetition timer 21 closes inhibit gate circuits 15a and 15b and stops pulse supply to the counters 16a and 16b, and is also simultaneously sent to AND circuit 18 as a trigger gate signal. FIG. 7 shows the detail of an example of repetition timer 21. This is provided with an astable multivibrator G for excitation of repetition and also with a monostable multivibrator H for timer operation.

The output of timer 21 is also supplied, through a differentiation circuit (not shown) to a reset timer 22 as an input thereof. After the comparison of the counted values has been finished, timer 22 supplies a reset signal through an AND circuit 23 for resetting the counters 16a and 16b.

It will be appreciated that the above-mentioned structure is particularly suitable for use in a camera. As to the operation involved in automatically focusing the camera, first, objective 11 is directed to the object to be photographed and the power switch is closed. Then, the oscillation pulses of oscillators 1a and 1b are supplied to counters 3a and 3b, respectively. When timer 13 produces an output, the pulse supply to counters 3a and 3b is stopped and at the same time, through the action of transfer circuits 4a and 4b receiving the driving pulses of the differentiation circuit 14, the counted values of the counters 3a and 3b are transferred to shift regisers 5a and 5b, respectively. After completion of this transfer operation, the constant-frequency shift pulses of oscillator 6 are supplied to the registers 5a and 5b.

Consider now the operation involved when the image forming position is initially in the left-side out-of-focus range of FIG. 2. Then, oscillator 1a is of higher frequency than oscillator 1b so that, upon comparison, it is found that the content of shift register 5a is greater. Therefore, with supply of shift pulses, a discriminating singnal $V_a$ is produced.

Upon producing the output of timer 12, the discriminating signal $V_a$ actuates drive section 10. The time duration of timer 12 is established with consideration to the counting time of counters 3a and 3b and the time for comparing the counted values of the shift registers 5a and 5b.

Then, the drive section 10 causes objective 11 to be moved, so that the image-forming position moves from the left-side out-of-focus position toward the in-focus point $Q_o$.

Producing output of the timer 12 opens inhibit gate circuits 15a and 15b, so that the oscillation pulses of oscillators 1a and 1b are supplied to counters 16a and 16b, respectively. However, the frequencies of oscillators 1a and 1b are at this time not equal to each other, so that coincidence circuit 17 does not produce a coincidence signal. Then, the output of timer 22 causes counters 16a and 16b to be reset. Immediately after resetting of counters 16a and 16b, the output of repetition timer 21 returns to zero, so that the counters 16a and 16b start again to count receiving the oscillation pulses of oscillators 1a and 1b, respectively. If the resulting counted values are not equal to each other, the coincidence signal is not produced and objective 11 continues to be moved. Thus, in out-of-focus stage, with objective 11 in movement, counters 16a and 16b repeat counting operation.

The movement of objective 11 brings the image forming position finally to the in-focus point. For example, when the internal resistance values of the photoconductor elements contained in oscillators 1a and 1b, respectively, reach $R_a$ and $R_b$ as indicated in FIG. 2, respectively, the oscillation frequencies of oscillators 1a and 1b become equal to each other. Then, the counted values of the counters 16a and 16b, which repeatedly count the pulses of oscillators 1a and 1b, respectively, become equal to each other, so that AND circuit 18 produces a coincidence signal. The pulses of equal frequency are supplied from oscillators 1a and 1b to counters 16a and 16b, respectively. The time during which these pulses are supplied is under control of repetition timer 21: Supply of the pulses is made while the output of timer 21 is zero; and simultaneously with producing this output the pulse supply is stopped and a trigger signal is sent to the trigger gate 18a of AND circuit 18. The coincidence signal produced by AND circuit 18 makes SCR 19 conductive, so that the excited relay coil 20 stops the operation of the drive section 10.

Timer 22, receiving the output of repetition timer 21, gives after lapse of a predetermined time reset signals to counters 16a and 16b through AND circuit 23.

Thus, the movement of objective 11 is brought to an end. At this time the image forming position is at the in-focus point $Q_o$ so that the objective is correctly focused.

Consider now the operation involved when, with objective 11 being directed to the object to be photographed and the power switch being closed, the image forming position is in the right-side out-of-focus range of FIG. 2. In this stage, oscillator 1b is of higher frequency than oscillator 1a, so that, as a result of comparison of the counted values of counters 3a and 3b, a discriminating signal $V_b$ is obtained. Accordingly, objective 11 is moved in the opposite direction with respect to the above-mentioned case through the operation of the drive section 10. The time for stopping this movement of the objective 11 and the necessary circuit operation can be considered in the same manner as the above.

If the objective is already in in-focus condition when it is directed to the object to be photographed and the power switch is closed, then, from the beginning, the counted values of counters 3a and 3b and those of counters 16a and 16b are equal to each other. Single-stage flip-flop 8 is initially in its reset state and the discriminating signal $V_b$ is produced. However, before objective 11 starts to be moved through the operation of drive section 10, the produced coincidence signal stops the operation of the drive section 10, so that objective 11 does not move.

As mentioned above, irrespective of which side the image forming position is on with respect to the in-focus point, objective 11 is automatically moved into the in-focus state.

Figure 8:
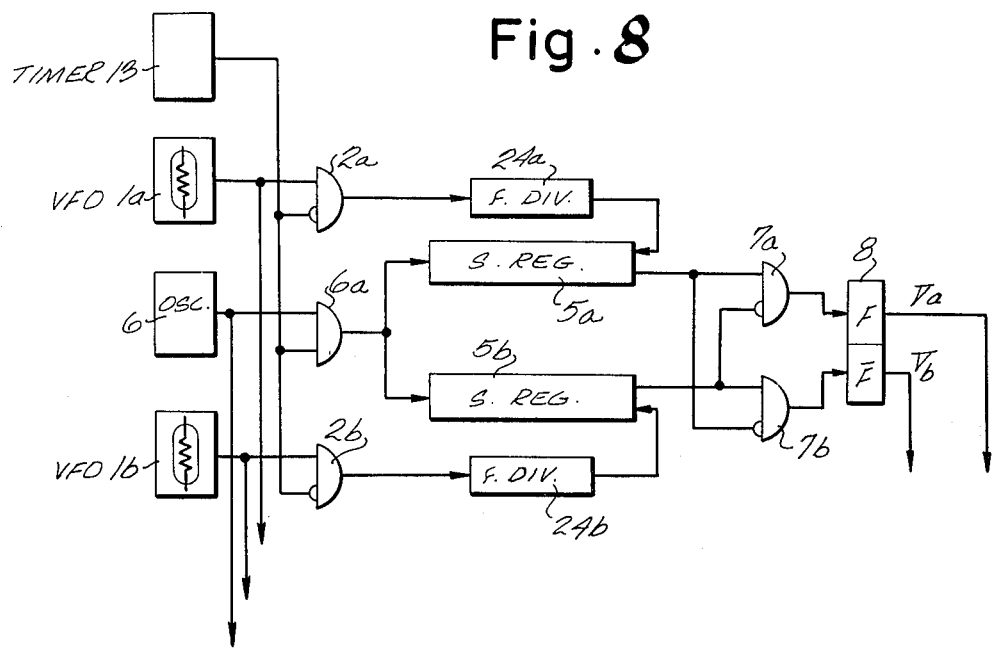
FIG. 8 is a block diagram showing an alternative arrangement for producing the drive-direction control signal used in an automatic focusing system according to the invention.
Figure 9:
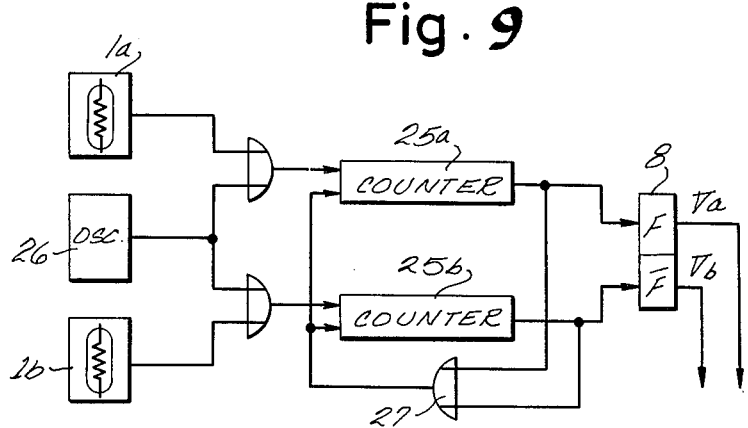
FIG. 9 is a block diagram showing another alternative embodiment for producing the drive-direction control signal.

FIGS. 8 and 9 show other examples of circuit means for obtaining the discriminating signals $V_a$ and $V_b$. The same elements as the example of FIG. 1 are denoted by the same numerals and characters.

In the circuit means of FIG. 8, oscillation pulses of oscillators 1a and 1b are supplied to shift registers 5a and 5b through frequency divider circuits 24a and 24b, respectively. The contents of shift registers 5a and 5b after lapse of a predetermined time are compared through supply of shift pulses produced by oscillator 6. This comparison produces the discriminating signal $V_a$ or $V_b$.

In the circuit means of FIG. 9, pulses of oscillators 1a and 1b are supplied to binary counters 25a and 25b during a predetermined time, and then pulses of constant frequency produced by oscillator 26 are additionally supplied. Of the counters 25a and 25b, one which overflows earlier has the greater counted values. With the supply of the additional pulses, a discriminating signal $V_a$ or $V_b$ is produced. An OR circuit 27 constitutes a circuit for resetting the counters 25a and 25b.

As mentioned above, according to the present invention, comparison is made of two series of pulses corresponding to the image forming position of the optical system and as a result a discriminating signal is obtained which determines the direction of movement of the objective, and detection is made of the state where the frequencies of these two series of pulses are equal to each other and as a result there is obtained a coincidence signal for stopping the movement of the objective. Thus, the focusing means utilizing the internal resistance characteristic of photoconductor elements are constituted by digital circuits. As a result, the measurement accuracy are highly improved and the influence on the circuit through fluctuation of power source voltage or ambient temperature is diminished.

Further, according to the present invention, arrangement can be so made as to make possible not only to make automatic focusing operation but also to make focusing operation following a moving object to be photographed. In the latter case, either there is provided a power source switch which is automatically and repeatedly caused to make open-close operations or the above mentioned timers 12 and 13 are constituted as repetition timers. With such arrangement, there can be obtained discriminating signals and coincidence signals corresponding to the positions of the moving object to be photographed, so that the focusing operation is made following the moving object to be photographed. Thus, the present invention is very advantageous also for small-sized cameras.

FIG. 10 is a timing diagram of the embodiment shown in FIG. 1. Here, some explanation about the embodiment in FIG. 1 is added. The relay coil 20 makes the responsive switch included in the driving circuit 10 (shown in FIG. 5) open to stop working of the driving circuit 10. Furthermore, the time 12 shown in FIG. 1 generates a signal for actuating the repetition timer, as well as provides AND circuits 9a, 9b with output. Each oscillator in FIG. 1 starts working when connected to the power source and stops working when released from the power source.

What is claimed is:

1. In an automatic focusing system having an objective spaced an adjustable distance from an image plane, apparatus which comprises:

first means for producing first and second variable-frequency signals that have substantially the same frequency when light passing through the objective is brought into focus at the image plane, the first means including a first photoconductor element having impinging on it light which has traversed a first distance from the objective to reach the first photoelectric element, the first distance being less than the adjustable distance by a predetermined amount a second photoconductor element having impinging on it light which has traversed a second distance from the objective to reach the second photoelectric element, the second distance being greater than the adjustable distance by a predetermined amount each of the photoelectric elements serving as a variable resistor having a peak resistance value when the light impinging on it is in focus;

a first variable frequency oscillator controlled by the resistance value of the first photoelectric element for producing the first variable frequency signal, and a second variable frequency oscillator controlled by the resistance value of the second photoelectric element for producing the second variable frequency signal; and second means responsive to a difference in frequency between the first and second variable-frequency signals for adjusting the spacing between the objective and the image plane to a relative position at which the frequencies thereof are substantially the same.

2. In an automatic focusing system having an objective spaced an adjustable distance from an image plane, apparatus which comprises:

first means for producing first and second variable frequency signals that have substantially the same frequency when light passing through the objective is brought into focus at the image plane, the first means including a first photoconductor element having impinging on it light which has traversed a first distance from the objective to reach the first photoelectric element, the first distance being less than the adjustable distance by a predetermined amount;

a second photoconductor element having impinging on it light which has traversed a second distance from the objective to reach the second photoelectric element, the second distance being greater than the adjustable distance by a predetermined amount;

each of the photoelectric elements serving as a variable resistor having a peak resistance value when the light impinging on it is in focus;

a first variable frequency oscillator controlled by the resistance value of the first photoelectric element for producing the first variable frequency signal; and a second variable frequency oscillator controlled by the resistance value of the second photoelectric element for producing the second variable frequency signal; and second mens responsive to a difference in frequency between the first and second variable-frequency signals for adjusting the spacing between the objective and the image plane to a relative position at which the frequencies thereof are substantially the same, wherein the second means includes a first digital circuit arrangement responsive to the first and second variable-frequency signals for producing a drive-direction control signal to specify the direction in which the adjustable distance should be adjusted to bring the image into focus, and includes a second digital circuit arrangement responsive to the first and second variable frequency signals for producing a coincidental signal when the frequencies thereof are substantially the same.

3. The apparatus of claim 2 wherein the first digital circuit arrangement includes first and second counters, first and second parallel-input shift registers, and a logic circuit arrangement; the first and second counters respectively responding to the first and second variable-frequency signals to accumulate first and second multi-bit counted values, the first and second shift registers receiving the first and second multi-bit counted values in parallel and shifting them out in serial format to the logic circuit arrangement; the logic circuit arrangement including circuit means responsive to the serial-format counted values to produce the drive-direction control signal.

4. The apparatus of claim 2 wherein the first digital circuit arrangement includes first and second frequency divider circuits, first and second serial-input shift registers, and a logic circuit arrangement; the first frequency dividers being connected between the first varible-frequency oscillator and the first shift register; the second frequency divider being connected betwen the second variable-frequency oscillator and the second shift register; the logic circuit arrangement being connected to both the shift registers and having an output for providing the drive-direction control signal.

5. The apparatus of claim 2 wherein the first digital circuit arrangement includes first and second counters, each including a counter output for specifying an overflow condition; the first counter being responsive to the first variable-frequency signal; the second counter being responsive to the second variable-frequency signal; the first digital circuit arrangement further including circuit means, connected to the counter outputs, for producing the drive-direction control signal.

* * * * *